(12) United States Patent
Ito et al.

(10) Patent No.: US 8,619,189 B2
(45) Date of Patent: Dec. 31, 2013

(54) IMAGE PROCESSING APPARATUS TO REDUCE ISOLATED NOISE EFFECTS IN MOVING IMAGE DRIVE DISTRIBUTION PROCESSING

(75) Inventors: Yasushi Ito, Yokohama (JP); Eisaku Tatsumi, Kawasaki (JP); Kazuya Kitada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 12/965,137

(22) Filed: Dec. 10, 2010

(65) Prior Publication Data

US 2011/0141350 A1    Jun. 16, 2011

(30) Foreign Application Priority Data

Dec. 16, 2009    (JP) ................................ 2009-285767

(51) Int. Cl.
*H04N 1/393* (2006.01)
*H04N 7/01* (2006.01)

(52) U.S. Cl.
USPC ........... 348/441; 348/581; 348/443; 348/459; 348/561; 348/704; 382/298

(58) Field of Classification Search
USPC ................. 348/441, 443, 459, 561, 581, 704; 382/276, 298, 299; 358/451
See application file for complete search history.

(56) References Cited

U.S. PATENT DOCUMENTS

| 7,542,619 B2 | 6/2009 | Toyooka |
| 7,844,128 B2 * | 11/2010 | Toyooka et al. ............ 382/276 |
| 2009/0273611 A1 | 11/2009 | Itokawa |

FOREIGN PATENT DOCUMENTS

| JP | 2000-030052 A | 1/2000 |
| JP | 2006-184896 A | 7/2006 |
| JP | 2009-271135 A | 11/2009 |

* cited by examiner

*Primary Examiner* — Jefferey Harold
*Assistant Examiner* — Jean W Desir
(74) *Attorney, Agent, or Firm* — Canon USA, Inc., IP Division

(57) ABSTRACT

An image processing apparatus, which converts a frame rate by dividing an input frame into sub-frames and outputting the sub-frames, includes a minimum value filter unit, a low-pass filter processing unit, a generation unit, and a switching unit. In an input frame, the minimum value filter unit selects a maximum value of minimum values from the minimum values of pixel values in each horizontal line in a predetermined area including peripheral pixels of a processing target pixel, and performs pre-processing to replace the processing target pixel with the maximum value. The low-pass filter processing unit performs low-pass filter processing on the pre-processed input frame and generates a first sub-frame. The generation unit generates a second sub-frame from the first sub-frame and the input frame. The switching unit switches the first sub-frame and the second sub-frame at predetermined timing and outputs a sub-frame.

12 Claims, 9 Drawing Sheets

FIG. 6

IMAGE PROCESSING APPARATUS TO REDUCE ISOLATED NOISE EFFECTS IN MOVING IMAGE DRIVE DISTRIBUTION PROCESSING

BACKGROUND OF THE INVENTION

1. Field of the Invention

The present invention relates to moving image processing for converting a frame rate, and more particularly to conversion into a higher frame rate such as conversion of an image of 60 hertz (Hz) into an image of 120 Hz.

2. Description of the Related Art

Conventionally, as a technique for suppressing motion blurs or flickers generated when a video is displayed by a display apparatus, there has been known a video display method for generating sub-frames different from each other in frequency component from image data, and alternately displaying the sub-frames at a multiplied speed (as discussed in Japanese Patent Application Laid-Open No. 2006-184896).

The video display method generates, from input image data, high-frequency emphasized image data where a high-frequency component is emphasized, and low-frequency image data including a low-frequency component where a high-frequency component is suppressed, and alternately displays these image data pieces at the multiplied speed. This technique can suppress flickers and reduce motion blurs.

Moreover, there is known a video display method for executing pre-processing for minimum value filter processing on input image data, and then, generating high-frequency emphasized image data where a high-frequency component is emphasized and low-frequency image data including a low-frequency component where a high-frequency component is suppressed. It is known that the method can improve a blur of a contour of a character and the like (as discussed in Japanese Patent Application Laid-Open No. 2009-271135.)

However, in the video display method for performing the minimum value filter processing on the input image data, for example, if a black-dot isolated noise exists within a filter application size, the noise is selected as the minimum value and the noise is extended.

SUMMARY OF THE INVENTION

The embodiments are directed to an image processing apparatus that can reduce an effect of a particular pattern such as a black-dot isolated noise in drive distribution processing and a control method of the image processing apparatus.

In an example, an image processing apparatus, which converts a frame rate by dividing an input frame into sub-frames and outputting the sub-frames, includes a minimum value filter unit, a low-pass filter processing unit, a generation unit, and a switching unit. In an input frame, the minimum value filter unit selects a maximum value of minimum values from the minimum values of pixel values in each horizontal line in a predetermined area including peripheral pixels of a processing target pixel, and performs pre-processing to replace the processing target pixel with the maximum value. The low-pass filter processing unit performs low-pass filter processing on the pre-processed input frame and generates a first sub-frame. The generation unit generates a second sub-frame from the first sub-frame and the input frame. The switching unit switches the first sub-frame and the second sub-frame at predetermined timing and outputs a sub-frame.

According to an aspect of the present invention, an effect of a particular pattern such as a black-dot isolated noise can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a conceptual diagram illustrating filter processing in the low-pass filer unit.

DESCRIPTION OF THE EMBODIMENTS

Various exemplary embodiments, features, and aspects of the invention will be described in detail below with reference to the drawings.

Figure 1:
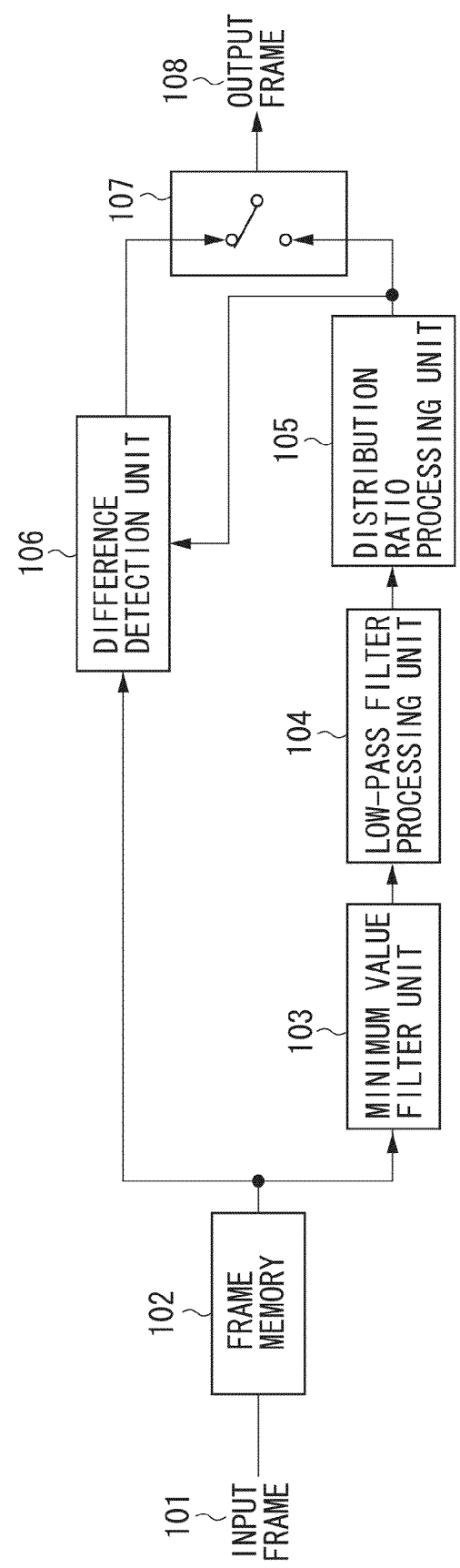
FIG. 1 is a block diagram illustrating an image processing apparatus according to a first exemplary embodiment.

FIG. 1 illustrates an example of an image processing apparatus for performing multiplied speed driving according to a first exemplary embodiment.

In FIG. 1, an input frame 101 that is an input image is subjected to conversion to a multiplied speed for twice-writing, and divided into two frames to generate a first sub-frame including only a low-frequency component and a second sub-frame including a high-frequency component. First, a method for generating the first sub-frame including only the low-frequency component is described.

Figures 2A, 2B:
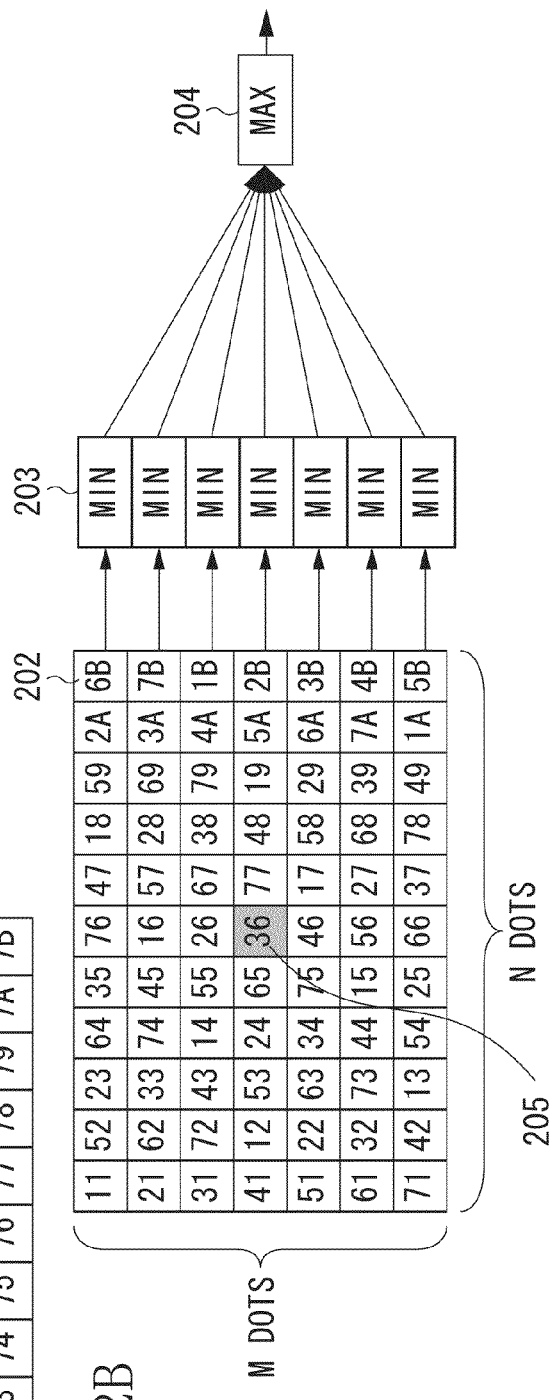
FIG. 2A illustrates an example of an input frame processing block.
FIG. 2B illustrates processing executed by a minimum value filter unit according to a second exemplary embodiment.

A minimum value filter unit 103 performs minimum value filter processing for selecting a minimum value of a pixel except an isolated noise in a block as pre-processing of low-pass filter processing in a low-pass filter processing unit 104. In the processing, as a predetermined area including peripheral pixels of a processing target pixel in the input frame 101, a block 201 having a predetermined size of m dots in height and n dots in width (for example, 7 dots×11 dots) is set as illustrated in FIG. 2A. The peripheral pixels may include those pixels on or near an edge of the predetermined area or constituting an outer boundary of the predetermined area. In the minimum value filter unit 103, the processing is performed on the block unit as a processing target block.

First, the minimum value filter unit 103 performs rearrangement on the block 201. As a method for the rearrangement, the minimum value filter unit 103 shifts the pixels by an x-pixel unit in each vertical line in the block 201. For example, if the block 201 shown in FIG. 2A is input, the minimum value filter unit 103 shifts the pixels by three-pixel unit in each vertical line. Accordingly, the block 201 is rearranged in a state of a block 202 shown in FIG. 2B. A number assigned to each pixel is for the purpose of description.

Then, the minimum value filter unit 103 selects a minimum value 203 of dot data of each horizontal line. Finally, from the minimum values 203, a maximum value 204 is selected, and a pixel value of a processing target pixel 205 is replaced with the maximum value 204. A series of the processes is performed on all pixels in the block.

Figure 3:
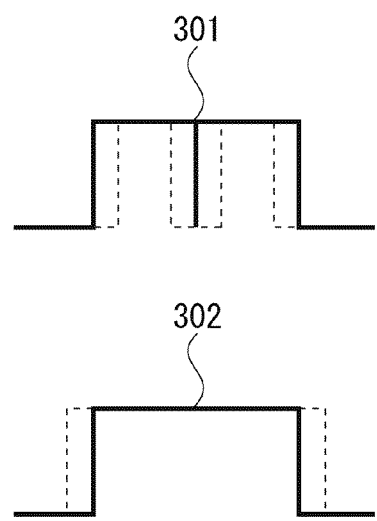
FIG. 3 illustrates waveforms generated when a horizontal line is added to an input frame.

The shift of the pixels by x-pixel unit in each vertical line is to distribute the input image as much as possible to perform the processing if a monotonous video is input in the horizontal direction. FIG. 3 illustrates waveforms generated when a black horizontal line is input onto a white background. A vertical line at a central part of a waveform 301 is the black horizontal line. On the waveform, if minimum value filter processing that is circulated each vertical line is performed, the waveform becomes like dotted lines of the waveform 301. However, by circulating the filtering on each vertical line, the filter processing shown as a solid line of a waveform 302 is performed. The processing is performed by the x-pixel unit to cope with a case a horizontal line has a width of one dot or more.

When an edge of the input frame (edge of the input image) is processed, a range of the processing target block to which the filtering is applied includes data outside of the processing target block. Thus, the data outside of the processing target block is also handled as a target of calculation, and accurate calculation may not be performed. To solve the problem, to the data outside the processing target block, image data of a value that cannot be the minimum value, for example, a maximum value, can be assigned in advance to prevent an effect on the filter processing result. In other words, image data can be assigned in advance to the data outside the processing target block to prevent an effect on the filter processing result and solve the problem, where that assigned image data is of a value that cannot be the minimum value. An example of image data having a value that cannot be the minimum value is image data having a maximum value. If a filter size (processing target block) is m dots in height and n dots in width, it is desirable that the number of the pixels to be extended outside the processing target block will be (m−1)/2, and (n−1)/2 respectively (m and n are integers of three or more and odd numbers).

Moreover, a counter for counting the number of the lines may be provided for each of the vertical lines and the horizontal lines. When the counter shows a count value indicating the edge of the input frame, the size of a predetermined block can be set such that the block is within the size of the processing target block, and processing to exclude the outside of the processing target block from the calculation target can be performed.

Figure 4:
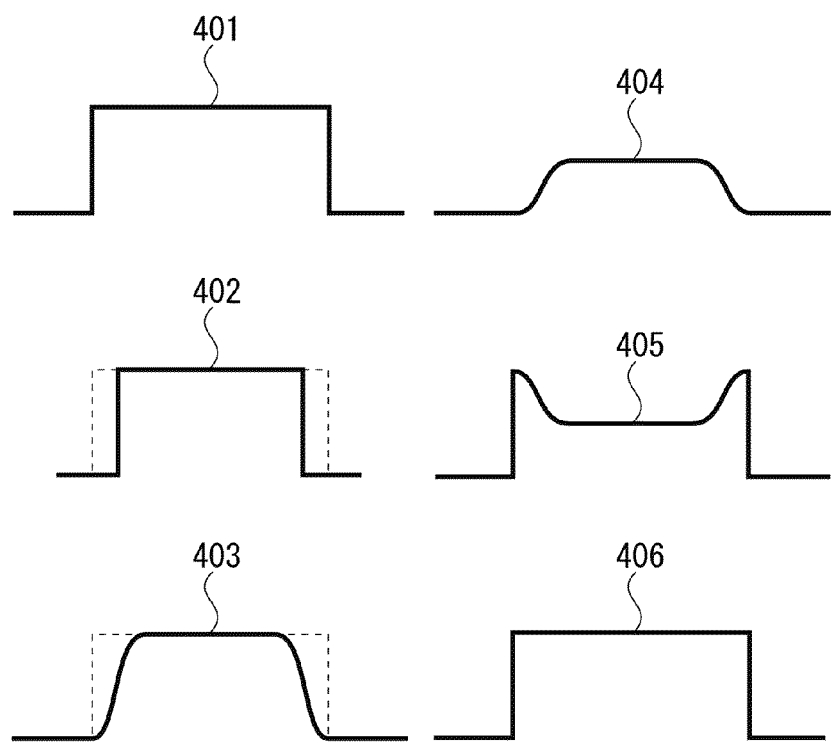
FIG. 4 illustrates processing waveforms according to the first exemplary embodiment.

In FIG. 4, a waveform 401 is an example of an input waveform. A waveform 402 is acquired as a result of performing minimum-value filtering for the input waveform 401 by the minimum-value filter unit 103. A pixel may be one of many tiny picture elements, organized into an array of horizontal lines and vertical lines, making up an image. A pixel value may represent an intensity of a pixel as an integer. For grayscale images, the pixel value typically is an 8-bit data value (with a range of 0 to 255) or a 16-bit data value (with a range of 0 to 65535). For color images, there are 8-bit, 16-bit, 24-bit, and 30-bit colors. In the input frame 101, in a boundary where a pixel value of a high luminance and a pixel value of a low luminance are adjacent to each other, the pixel value of the low luminance is selected. Thus, an edge boundary is narrowed inside a high-luminance area as indicated by the waveform 402.

Then, the low-pass filter processing unit 104 performs two-dimensional low-pass filter processing to the sub-frame of which high-luminance area is narrowed. For the low-pass filter, no particular function is defined. For example, Gaussian function or a moving average or weighted moving average filter can be used. The low-pass filter may pass values below a predetermined value and may attenuate values above that predetermined value.

Figure 5:
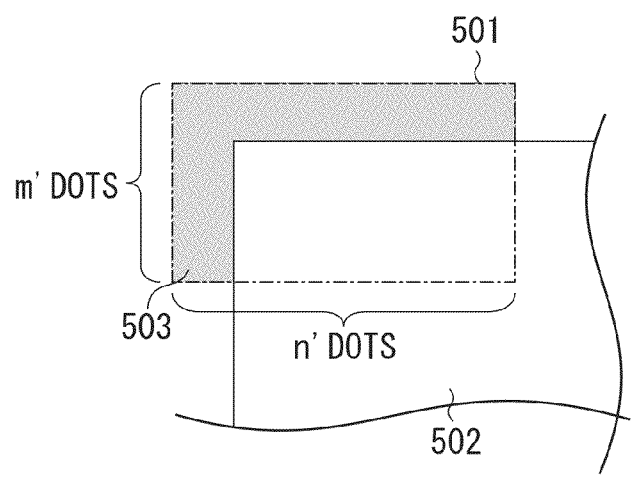
FIG. 5 illustrates filter processing in a low-pass filer unit.

The low-pass filter processing unit 104 sets a processing target block 501 of a predetermined size as illustrated in FIG. 5 with respect to the processing target pixels of the input frame. However, when an edge of an input frame 502 is processed, the processing target block 501 includes data in an area 503 that is outside of an effective area of the input frame as a calculation target. In this case, accurate filtering cannot be performed.

Figure 6:
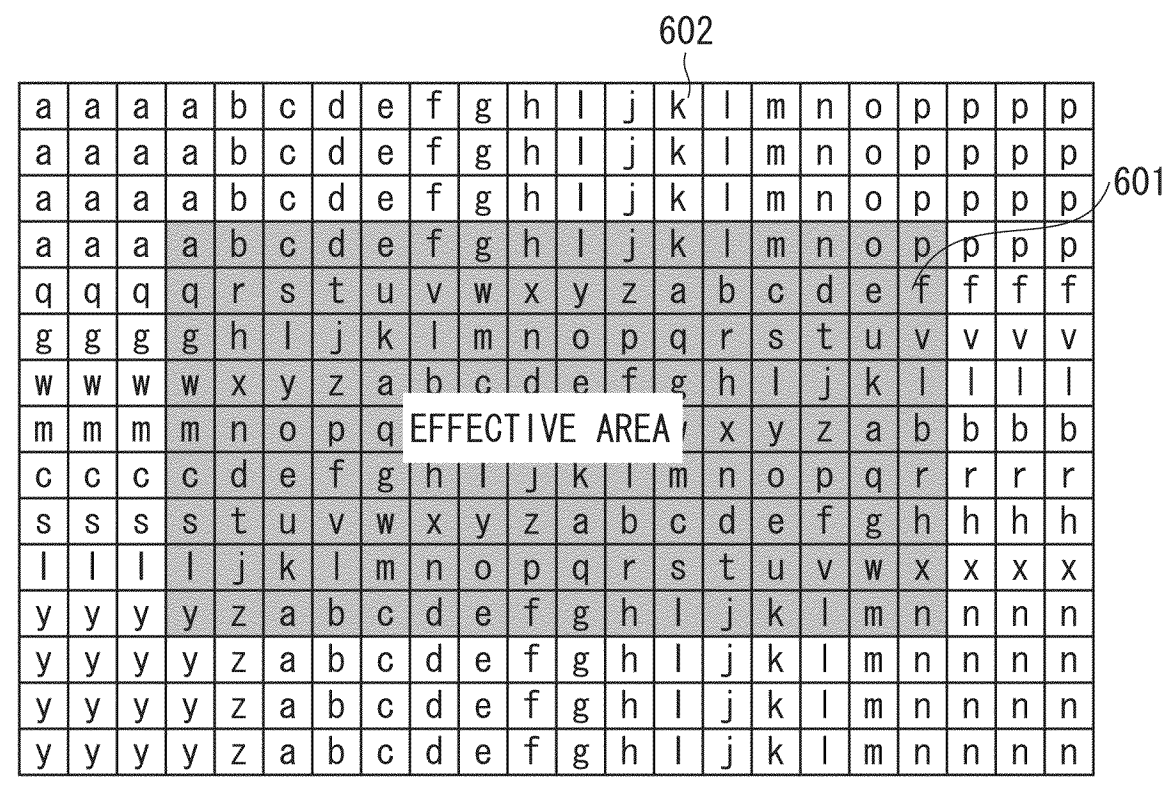

To solve the problem, as illustrated in FIG. 6, the outside of the effective area 601 of the input frame is processed as an area 602 to which the data of the edge of the inside of the effective area 601 is directly extended. By the processing, an effect due to a particular part of the edge of the input frame can be reduced and displayed. If the filter size is m' dots in height and n' dots in width, it is desirable that the number of the pixels to be extended outside of the effective area is (m'−1)/2, and (n'−1)/2 respectively (m' and n' are integers of three or more and odd numbers).

A waveform 403 is acquired as a result of performing the low-pass filter processing on the waveform 402.

A distribution ratio processing unit 105 determines a ratio of light emission from two sub-frames. To make flickers difficult to be perceived, a difference in brightness between the two sub-frames is advisably reduced. Accordingly, in the present exemplary embodiment, the description is made using an example of the ratio of 50% each. A waveform 404 in FIG. 4 is acquired by multiplying the waveform 403 by 0.5. The waveform 404 is set as a first sub-frame that contains only a low-frequency component.

As described above, by performing the minimum value filter processing and the low-pass filter processing on the input frame 101, the generation of the first sub-frame including only the low-frequency component is completed. The first sub-frame is output to a switching circuit 107.

Next, a method for generating a second sub-frame including a high-frequency component is described. A difference detection unit 106 subtracts the first sub-frame from the input frame 101, and outputs a difference as the second sub-frame. In other words, the input frame is divided into the first sub-frame and the second sub-frame. A waveform 405 in FIG. 4 shows a waveform of the second sub-frame.

A frame rate is frequency measurement expressed in Hertz (Hz) or frames per second (fps) that reflects how quickly an imaging device can produce consecutive images called frames. The switching circuit 107 converts a frame rate at desired timing, for example, in a case of an input of 60 Hz, the frame rate is converted with a frequency of 120 Hz, switches the two sub-frames, i.e., the second sub-frame and the first sub-frame, and outputs as output frames to a processing circuit of the latter stage. The switching circuit 107 can include a buffer circuit that temporarily stores the input sub-frames until each output timing arrives.

If the first sub-frame of the waveform 404 and the second sub-frame of the waveform 405 in FIG. 4 are alternately displayed at a high speed, visually, the sub-frames look like a waveform 406. Accordingly, the waveform 406 can be perceived as the same waveform as the waveform 401 of the input frame 101 in the display of 60 Hz. In many cases, color images are processed based on three types of image data such as R, G, and B values or Y, Cb, and Cr values. However, a series of processes can be performed for each of R, G, and B values, or for only a Y value. In addition, a Y value can be calculated from R, G, and B values, and a result can be applied to R, G, and B values.

Processing according to the above described exemplary embodiment is described with reference to a flowchart in FIG. 7.

In step S701, necessary initial setting is performed. In this case, a filter size in minimum-value filter processing, static characteristics of a low-pass filter, and the like are set. In step S702, the frame image 101 is input to the image processing apparatus. In the example illustrated in FIG. 4, the waveform 401 is input. In step S403, the minimum value filter unit 103 performs the minimum value filter processing on the input frame 101. In the example illustrated in FIG. 4, the waveform 402 indicates a result of the minimum value filter processing, and the dashed line indicates the original input waveform 401.

In step S704, the low-pass filter processing unit 104 performs the low-pass filter processing on the frame image output from the minimum value filter unit 103. In the example illustrated in FIG. 4, the waveform 403 indicates a result of the low-pass filter processing performed on the waveform 402. According to the above described processing, the generation of the first sub-frame including only the low-frequency component is completed.

Then in step S705, the distribution ratio processing unit 105 performs the distribution processing. The distribution processing determines a distribution ratio, that is, what percentage of the entire frame the sub-frame including only the low-frequency component occupies. In the present exemplary embodiment, the ratio is uniformly set to 50% regardless of pixel values. In the example illustrated in FIG. 4, the waveform 403 resulting from the low-pass filter processing is multiplied by 0.5 to acquire the waveform 404 which is reduced by half in brightness. According to the above described processing, the generation of the first sub-frame including only the low-frequency component is completed.

In step S706, the difference detection unit 106 calculates the second sub-frame as a difference image acquired by subtracting the first sub-frame generated from the input frame 101. In the example illustrated in FIG. 4, the waveform 405 indicates the difference waveform, and the waveform is the second sub-frame that includes the high-frequency component.

In step S707, the switching circuit 107 determines output timing of the frame. If it is the output timing of the first sub-frame (YES in step S707), the processing proceeds to step S708. In step S708, the first sub-frame is output.

After the first sub-frame is output, in step S709, output timing of the second sub-frame is determined. If it is the output timing of the second sub-frame (YES in step S709), then in step S710, the second sub-frame is output. The second sub-frame can be temporarily stored in the buffer circuit in the switching circuit 107, and output as an output frame 108 from the switching circuit 107 at the output timing.

If the processing is completed with respect to all frames (YES in step S711), the present processing ends. If an unprocessed frame exists (NO in step S711), the processing returns to step S702, and the processing is repeated.

Figure 7:
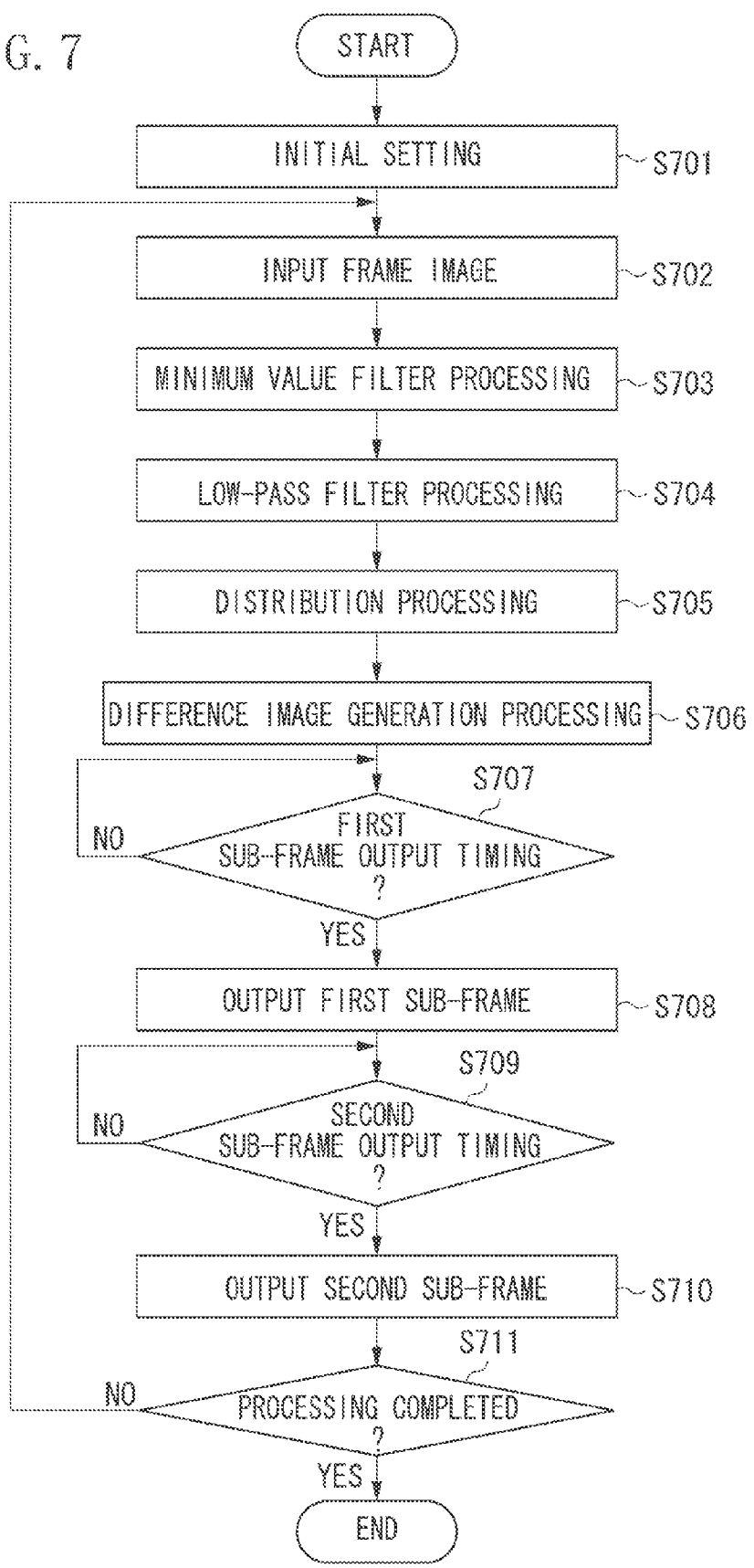
FIG. 7 is a flowchart illustrating a control method for the image processing apparatus according to the first exemplary embodiment.

The output order of the sub-frames described with reference to the flowchart in FIG. 7 is only an example, and thus the order is not limited to this. For example, after the second sub-frame is output, the first sub-frame can be output. Further, the output timing is determined after the generation of the two sub-frames in the above description. However, the exemplary embodiment is not limited to this. For example, the output timing of the first sub-frame can be determined at the time of the low-pass filter processing completion in step S704, and the difference detection can be performed after the output to generate the second sub-frame.

According to the above described exemplary embodiment, the first sub-frame is displayed in a first portion of one 120th second, and the second sub-frame is displayed in a next portion of one 120th second. Thus, an apparent waveform for average time of one sixtieth second is similar to the waveform 406 illustrated in FIG. 4, becoming similar to the waveform 401 of the input frame.

By performing the above described processing, according to the present exemplary embodiment, an effect of a particular pattern such as a black-dot isolated noise in driving distribution processing can be reduced.

In a second exemplary embodiment, filter processing different from that in the first exemplary embodiment is described.

Figure 8:
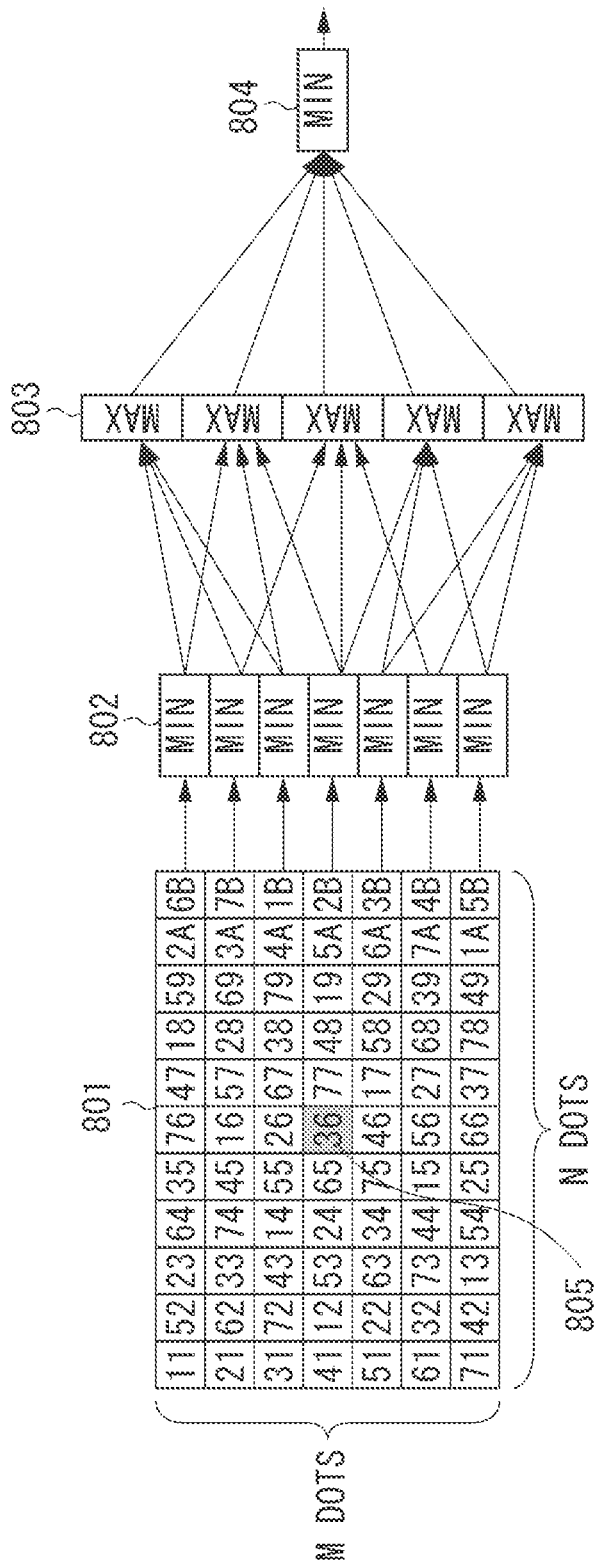
FIG. 8 illustrates processing in a minimum value filter unit according to the second exemplary embodiment.

FIG. 8 illustrates minimum value filter processing according to the second exemplary embodiment. First, the minimum value filter unit 103 performs rearrangement on a block 801, and then, selects a minimum value 802 of dot data in each horizontal line. So far, the processing is the same as that in the first exemplary embodiment. In the present exemplary embodiment, next, with respect to each of the minimum values 802, x pieces (for example, three pieces) thereof are considered as one set, and a maximum value 803 of each set is selected.

Then a minimum value 804 among the output maximum values 803 is used to replace a pixel value of a processing target pixel 805. A series of the processes is performed on all pixels in the block. In the present exemplary embodiment, by inserting the maximum value selection processing 803 between the processing of steps 802 and 804, up to three points of black-dot isolated noises in the area 801 can be removed. If needed, the number of the points can be changed depending on the number of noise to be removed.

By performing the above described processing, according to the present exemplary embodiment, an effect of a particular pattern such as a black-dot isolated noise in driving distribution processing can be reduced.

In the above exemplary embodiments, each unit in the apparatus illustrated in FIG. 1 is described as a hardware component. However, the units except the frame memory can be configured by computer programs. In this case, a computer that includes a memory for storing such a computer program and a central processing unit (CPU) for executing the computer program stored in the memory can be applied to the image processing apparatus according to each of the exemplary embodiments.

Figure 9:
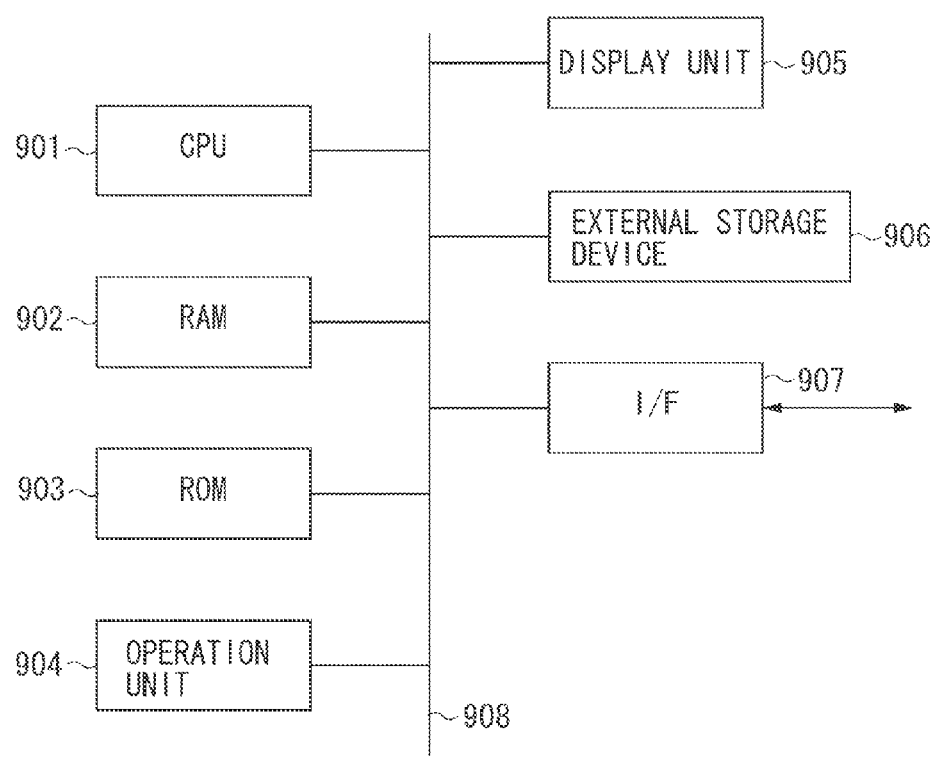
FIG. 9 illustrates an example of a hardware configuration of the image processing apparatus according to the exemplary embodiments.

FIG. 9 is a block diagram illustrating an example of a hardware configuration of a computer applicable to the image processing apparatus according to each of the above described exemplary embodiments.

A CPU 901 controls the entire computer using a computer program or data stored in a random access memory (RAM) 902 or a read-only memory (ROM) 903, and executes each processing described above as being executed by the image processing apparatus according to each exemplary embodiment. In other words, the CPU 901 functions as the units 103 to 107 illustrated in FIG. 1.

The RAM 902 includes an area for temporarily storing the computer program or the data loaded from an external storage device 906, or data acquired from the outside via an interface (I/F) 907 The RAM 802 further includes a work area used when the CPU 801 executes various processes. In other words, the RAM 802 can, for example, can be allocated as a frame memory or appropriately provide other various areas.

The ROM 903 stores setting data of the computer or a boot program. An operation unit 904 includes a keyboard and a mouse. Operated by a user of the computer, the operation unit 904 can input various instructions to the CPU 901. A display unit 905 displays a result of processing performed by the CPU 901. The display unit 905 includes a hold-type display apparatus such as a liquid crystal display, or an impulse display apparatus such as a field-emission type display apparatus.

The external storage device 906 is a large-capacity information storage device represented by a hard disk drive. The external storage device 906 stores a computer program to realize an operating system (OS), a function of each of the units illustrated in FIG. 1, or the flow of processing illustrated in FIG. 7 by the CPU 901. Further, the external storage device 906 can store each image data as a processing target.

The computer program or the data stored in the external storage device 906 is appropriately loaded to the RAM 902 under control of the CPU 901 to become a processing target of the CPU 901. A network such as local area network (LAN) or Internet, and other devices can be connected to the I/F 907. The computer can acquire or transmit various types of information via the I/F 907. A bus 908 interconnects the units.

An operation in the above described configuration is performed mainly by the CPU 901 by implementing the operation described with reference to the above described flowchart.

The embodiments can be applied to a system including a plurality of devices (for example, a host computer, an interface device, a reader, and a printer) or an apparatus including a single device (for example, a copying machine or facsimile).

Aspects of the embodiments can be achieved by supplying a storage medium recording codes of the computer program to realize the above described functions to a system, and reading and executing the codes of the computer program by the system. In this case, the codes of the computer program read from the storage medium realize the functions of the exemplary embodiments themselves, and the storage medium storing the codes of the computer program are part of the embodiments. Based on instructions of the codes of the computer program, the OS operated on the computer executes a part or all of actual processing to realize the functions.

Further, the embodiments can be realized by the following form. More specifically, codes of a computer program read from a storage medium are written in a memory included in a function extension card inserted into the computer or a function extension unit connected to the computer. Based on instructions of the codes of the computer program, a CPU included in the function extension card or the function extension unit executes a part or all of actual processing to realize the functions.

When an embodiment is applied to the storage medium, the storage medium stores the codes of the computer program corresponding to the processing illustrated in flowcharts. In an example, a computer-readable medium may store a program that causes an image processing apparatus to perform a method described herein. In another example, a central processing unit may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-285767 filed Dec. 16, 2009, which is hereby incorporated by reference herein in its entirety.

What is claimed is:

1. An image processing apparatus to reduce an effect of an isolated noise in a process that converts a frame rate by dividing an input frame into sub-frames and outputting the sub-frames, the image processing apparatus comprising:
a minimum value filter unit configured to acquire a pre-processed input frame from the input frame, wherein the minimum value filter unit obtains a set of minimum target values of a target pixel having an initial target pixel value in a processing target block of the input frame, selects one target value from the set of minimum target values, and replaces the initial target pixel value with the selected one target value to acquire the pre-processed input frame, wherein, in a case where a pixel value of an isolated noise is the minimum pixel value in the set of minimum target values, the minimum value filter unit does not select the isolated noise as the one target value from the set of minimum target values;
a low-pass filter processing unit configured to perform low-pass filter processing on the pre-processed input frame and generate a first sub-frame;
a generation unit configured to generate a second sub-frame from the first sub-frame and the input frame; and
a switching unit configured to switch the first sub-frame and the second sub-frame at a predetermined timing and output a sub-frame.

2. The image processing apparatus according to claim 1, wherein the minimum value filter unit processes an outside area outside of an effective area of the input frame by directly extending data of an edge of an inside of the effective area into the outside area for a predetermined number of pixels.

3. A non-transitory computer-readable medium storing a computer-executable program that, when read and executed by a computer, causes the computer to function as the image processing apparatus according to claim 1.

4. The image processing apparatus according to claim 1, wherein the minimum value filter unit obtains the set of minimum target values from minimum target values of pixel values in each horizontal line or each vertical line of the processing target block and then selects a maximum value from the set of minimum target values as the selected one target value to replace the initial target pixel value and acquire the pre-processed input frame.

5. The image processing apparatus according to claim 1, wherein, before obtaining the set of minimum target values, the minimum value filter unit shifts pixel values by a predetermined pixel unit in vertical lines of an initial target block to obtain the processing target block.

6. The image processing apparatus according to claim 1, wherein, before obtaining the set of minimum target values, the minimum value filter unit shifts pixel values by a predetermined pixel unit in horizontal lines of an initial target block to obtain the processing target block.

7. The image processing apparatus according to claim 1, wherein image data of a value that cannot be the minimum value in a set of minimum target values is assigned to data outside of the processing target block in advance of acquiring the pre-processed input frame from the input frame.

8. The image processing apparatus according to claim 7, wherein the image data having a value that cannot be the minimum value is image data having a maximum value.

9. The image processing apparatus according to claim 1, wherein the switching unit receives an output timing of the first sub-frame that was determined at a time of the low-pass filter processing unit completing a process to generate the first sub-frame.

10. The image processing apparatus according to claim 1, wherein, before selecting the one target value from the set of minimum target values that is not an isolated noise and to remove multiple points of isolated noises in the processing target block, the minimum value filter unit divides the set of minimum target values into a plurality of sets of pieces and selects a maximum target value from each of the plurality of sets of pieces to output a set of maximum target values from which the minimum value filter unit selects the one target value, such that an effect of a particular pattern such as a black-dot isolated noise in driving distribution processing can be reduced.

11. A method for controlling an image processing apparatus to reduce an effect of an isolated noise in a process that converts a frame rate by dividing an input frame into sub-frames and outputting the sub-frames, the method comprising:

acquiring a pre-processed input frame from the input frame, wherein acquiring includes obtaining a set of minimum target values of a target pixel having an initial target pixel value in a processing target block of the input frame, selecting one target value from the set of minimum target values, and replacing the initial target pixel value with the selected one target value to acquire the pre-processed input frame, wherein, in a case where a pixel value of an isolated noise is the minimum pixel value in the set of minimum target values, selecting the one target value includes not selecting the isolated noise as the one target value from the set of minimum target values;

performing low-pass filter processing on the pre-processed input frame and generating a first sub-frame;

generating a second sub-frame from the first sub-frame and the input frame; and switching the first sub-frame and the second sub-frame at a predetermined timing and outputting a sub-frame.

12. A non-transitory computer-readable medium storing a program that causes an image processing apparatus to perform the method according to claim 11.

* * * * *